(12) United States Patent
Saito et al.

(10) Patent No.: US 6,627,137 B2
(45) Date of Patent: Sep. 30, 2003

(54) INSERT MOLDING METHOD AND MOLD

(75) Inventors: Toshio Saito, Tokyo (JP); Ikuhiko Ozeki, Kohnan (JP)

(73) Assignee: Fisa Corporation, Tokyo (JP)

( * ) Notice: Subject to any disclaimer, the term of this patent is extended or adjusted under 35 U.S.C. 154(b) by 245 days.

(21) Appl. No.: 09/850,110

(22) Filed: May 8, 2001

(65) Prior Publication Data

US 2001/0054781 A1 Dec. 27, 2001

(30) Foreign Application Priority Data

May 22, 2000 (JP) ..................... P2000-149547

(51) Int. Cl.$^7$ ............................... B29C 48/14
(52) U.S. Cl. ................. 264/275; 264/272.15; 425/125; 425/127
(58) Field of Search ................ 425/117, 125, 425/127, 129.1; 264/272.15, 275

(56) References Cited

U.S. PATENT DOCUMENTS

| | | | |
|---|---|---|---|
| 2,341,364 A | * 2/1944 | Crumrine | 264/278 |
| 3,363,040 A | * 1/1968 | Aoki | 425/125 |
| 3,685,784 A | * 8/1972 | Spanjer | 425/129.1 |
| 4,044,984 A | * 8/1977 | Shimizu et al. | 425/127 |
| 4,861,251 A | * 8/1989 | Moitzger | 264/272.15 |
| 5,609,889 A | * 3/1997 | Weber | 264/275 |
| 6,019,588 A | * 2/2000 | Peters et al. | 425/125 |
| 6,471,501 B1 | * 10/2002 | Shinma et al. | 425/127 |

FOREIGN PATENT DOCUMENTS

| | | | |
|---|---|---|---|
| EP | 0274840 | 7/1988 | |
| JP | 62-236719 | 10/1987 | |
| JP | 63-274521 | 11/1988 | |
| JP | 08288326 A | * 11/1996 | ........... B29C/45/14 |

* cited by examiner

*Primary Examiner*—Robert Davis
(74) *Attorney, Agent, or Firm*—Roylance, Abrams, Berdo & Goodman, LLP

(57) ABSTRACT

An insert molding method and mold has an upper mold and a lower mold disposed to oppose each other. The cavity at the upper mold side is filled with molten resin or rubber material injected through a gate to perform injection molding of the resin or rubber around an insert set at the lower mold side. A movable supporting member sets the insert, and is fitted in a recessed part formed on the upper face of the lower mold. The position of the center of gravity at the lower face of the movable supporting member is supported and pressed towards the upper mold side by the tip of a shaft of a pressing mechanism. A gap is between the side face part of the recessed part and the side face part of the movable supporting member to cause the movable supporting member to tilt about the point at which the movable supporting member is pressed and supported by the shaft inside the recessed part so that the upper face of the insert will be in uniform surface contact with the lower face of the upper mold.

8 Claims, 4 Drawing Sheets

INSERT MOLDING METHOD AND MOLD

This invention concerns a molding method, in which a synthetic resin or rubber is molded upon an insert (work piece) which is set beforehand inside a mold (this method is referred to hereinafter as the "insert molding or insert molding method"), and a mold to be used in said insert molding method, and discloses an insert molding method and mold that are excellent in terms of prevention of insert breakage, prevention of burr formation, and manufacture, operation, maintenance, etc. of molds.

This invention provides in an insert molding method, wherein an upper mold and a lower mold are disposed so as to oppose each other and a cavity at the upper mold side is filled with molten resin or rubber material that is injected through a gate to perform injection molding of the resin or rubber around an insert set at the lower mold side, an insert molding method and mold characterized in that a movable supporting member, which sets the above mentioned insert, is fitted in a recessed part formed on the upper face of the above mentioned lower mold, the position of the center of gravity at the lower face of the movable supporting member is supported and pressed towards the upper mold side by the tip of a shaft of a pressing mechanism, and a gap is made to exist between the side face part of the above mentioned recessed part and the side face part of the movable supporting member to cause the movable supporting member to tilt about the point at which the movable supporting member is pressed and supported by the above mentioned shaft inside the above mentioned recessed part so that the upper face of the insert will be in uniform surface contact with the lower face of the upper mold.

BACKGROUND OF THE INVENTION

1. Field of the Invention

This invention concerns a molding method, in which molding of a synthetic resin or rubber is performed upon an insert (work piece) which is set beforehand inside a mold (this method is referred to hereinafter as the "insert molding or insert molding method"), and a mold to be used in said insert molding method.

2. Description of the Prior Art

In an insert molding method, molding by synthetic resin is performed upon a formed part, called an insert or a work piece, which is set beforehand inside a molding mold to form resin molded parts on the upper surface or surroundings of the insert, and is widely used in the manufacture of various electronic parts, etc. Though insert molding method is applied to various resin molding methods, this invention is limited to the injection molding method.

The insert to be set beforehand inside the mold may be a worked resin molded part (of plate shape, rod shape, box shape, or other shape) or may be a part made from a non-resin material, such as metal, glass, ceramic, carbon, etc.

In many cases, the insert is not manufactured with high dimensional precision, and for example, in the case where inserts that are scattered in the thickness dimension are set in molds to perform injection molding, depending on the insert, a gap may form at the surface of contact of a part of the insert and an upper mold even if clamping is performed and the resin that is injected into this part may flow out and become a burr.

The details of the above shall now be described with reference to drawings. As shown in FIG. 3, when an insert 1, having the shape of a flat plate, is low in working precision and has a thickness difference such that $h_1 < h_2$ and mold clamping is performed upon setting this insert on the upper face of a lower mold 2, the upper surface portion of insert 1 at the side of greater thickness (the $h_2$ side) will contact the lower face of an upper mold 3 while a gap will form at the side of smaller thickness (the $h_1$ side). Put in another way, since insert 1 is inclined, a gap will form at the peripheral lower face of a cavity (recessed part) 4 prepared at the upper mold 3 side. Since cavity 4 is a part that will become a molded product made of synthetic resin, if injection of plastic via a gate 5 is performed in the condition where there is a gap at the lower face, a burr 7 will form at the lower end part of the resin molded product 6 as shown in FIG. 4.

In particular, with the injection molding method, since the resin is injected at high pressure, resin can leak out from even an extremely small gap and give rise to burrs. If a low injection pressure is set to prevent the formation of burrs, the precision and physical properties of the molded product will become poor.

Several modifications for preventing the above-described formation of burrs in insert molding have been tried and the results of such modifications have been disclosed for example in Japanese Unexamined Patent Publication No. Hei-8-288326.

SUMMARY OF THE INVENTION

Resolution of the problem of burr formation in insert molding is demanded since it leads not only to manufacturing loss but also to increased manufacturing cost resulting from the necessity for burr removal work.

The above mentioned Japanese Unexamined Patent Publication No. Hei-8-288326 teaches that by using a resilient member (a plurality of coiled springs) to support the lower face side of a supporting member on which an insert is set, the scattering of the thickness of inserts can be absorbed to prevent the formation of burrs. However, since the dimensional scattering of inserts is not fixed and there are various forms of scattering, supporting by a plurality of springs that apply a uniform force on the insert supporting member does not provide a satisfactory solution.

Also as has been mentioned above, inserts are not limited to pressed metal inserts and synthetic resin inserts but also include ceramic, carbon, and glass inserts that can break readily at low impact force, and especially with the latter types of inserts, breakage of the insert set in the mold in the clamping process can occur and lead to manufacturing loss when there is scattering of the precision of outer shape.

This invention has been made in view of the above and an object thereof is to present an insert molding method and mold that are excellent in terms of prevention of insert breakage, prevention of burr formation, and manufacture, operation, maintenance, etc. of molds.

The insert molding method and the mold to be used in inserting molding by this invention are characterized in having the following arrangements.

A. In an insert molding method, wherein an upper mold and a lower mold are disposed so as to oppose each other and the cavity at the upper mold side is filled by molten resin or rubber material that is injected via a gate to perform injection molding of the resin or rubber around an insert set at the lower mold side, an insert molding method characterized in that a movable supporting member, which sets the above mentioned insert, is fitted in a recessed part formed on the upper face of the above mentioned lower mold, the position of the center of gravity at the lower face of the movable supporting member is supported and pressed towards the upper mold side by the tip of a shaft of a pressing mechanism, and a gap is made to exist between the side face part of the above mentioned recessed part and the side face part of the movable supporting member to cause the movable supporting member to tilt about the point at which the movable supporting member is pressed and supported by the above mentioned shaft inside the above mentioned recessed part so that the upper face of the insert will be in uniform surface contact with the lower face of the upper mold.

B. In an insert molding mold, which is comprised of (a) an upper mold, (b) a lower mold, which is disposed so as to oppose the upper mold, (c) a recessed part, formed on the upper face of the above mentioned lower mold, (d) a movable supporting member, which is fitted into the recessed part, (e) an insert setting part, which is provided on the upper face of the movable supporting member, (f) a cavity, provided on the mold surface at the lower face of the above mentioned upper mold that opposes the above mentioned insert, and (g) a gate, provided at the upper mold for injection of molten resin or rubber material into the cavity, and is arranged for performing injection molding of resin or rubber material around the insert set on the upper face of the above mentioned movable supporting member by filling of the above mentioned cavity of the upper mold by injection of the molten resin or rubber material via the gate, an insert molding mold characterized in having (h) a pressing mechanism, which has a shaft that supports and presses the position of the center of gravity of the lower face of the above mentioned supporting member towards the upper mold side and in that (i) a gap is formed between the side face part of the above mentioned recessed part and the side face part of the movable supporting member and the above mentioned movable supporting member is enabled to tilt about the point of pressing and support by the above mentioned shaft inside the above mentioned recessed part so that the upper face of the insert will be in surface contact with the lower face of the upper mold.

C. An insert molding method as set forth in A above, wherein the outer shape (planar shape) of the side face of the above mentioned movable supporting member is formed to be similar to the outer shape (planar shape) of the side face of the insert.

D. An insert molding mold as set forth in B above, wherein the outer shape (planar shape) of the side face of the above mentioned movable supporting member is formed to be similar to the outer shape (planar shape) of the side face of the insert.

E. An insert molding method as set forth in A or C above, wherein the gap between the side face part of the above mentioned recessed part and the side face part of the movable supporting member is large at the side close to the upper mold and small at the side away from the upper mold.

F. An insert molding mold as set forth in B or D above, wherein the gap between the side face part of the above mentioned recessed part and the side face part of the movable supporting member is large at the side close to the upper mold and small at the side away from the upper mold.

G. An insert molding method as set forth in A or C above, wherein the gap between the side face part of the above mentioned recessed part and the side face part of the movable supporting member is arranged to be greatest at the position closest to the upper mold and to decrease gradually and become zero with the distance from the upper mold.

H. An insert molding mold as set forth in B or D above, wherein the gap between the side face part of the above mentioned recessed part and the side face part of the movable supporting member is arranged to be greatest at the position closest to the upper mold and to decrease gradually and become zero with the distance from the upper mold.

DETAILED DESCRIPTION OF THE INVENTION

An embodiment of this invention shall now be described based on the attached drawings. This embodiment is an example of the case where the upper mold is a fixed mold and the lower mold is a movable mold.

The drawings show a preferred embodiment of the invention and a prior art, in which:

FIG. 1 shows an insert molding mold by this invention, with A section through F section illustrating one cycle of injection molding. In this embodiment, a hydraulic ejector 40 is used as an example of a pressing mechanism.

Figure 1:
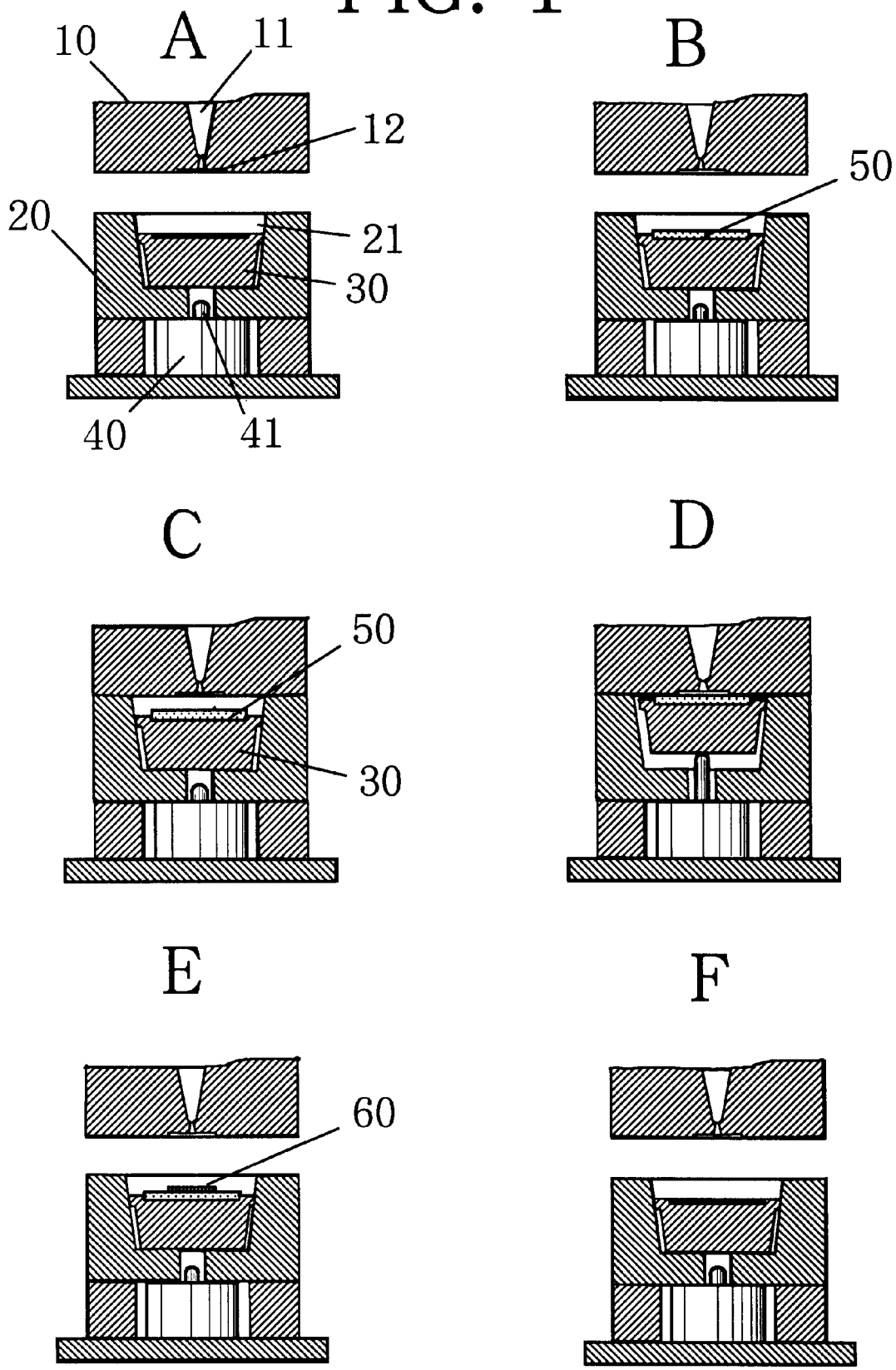
FIG. 1 shows schematic sectional views of a mold by this invention.
Figure 2:
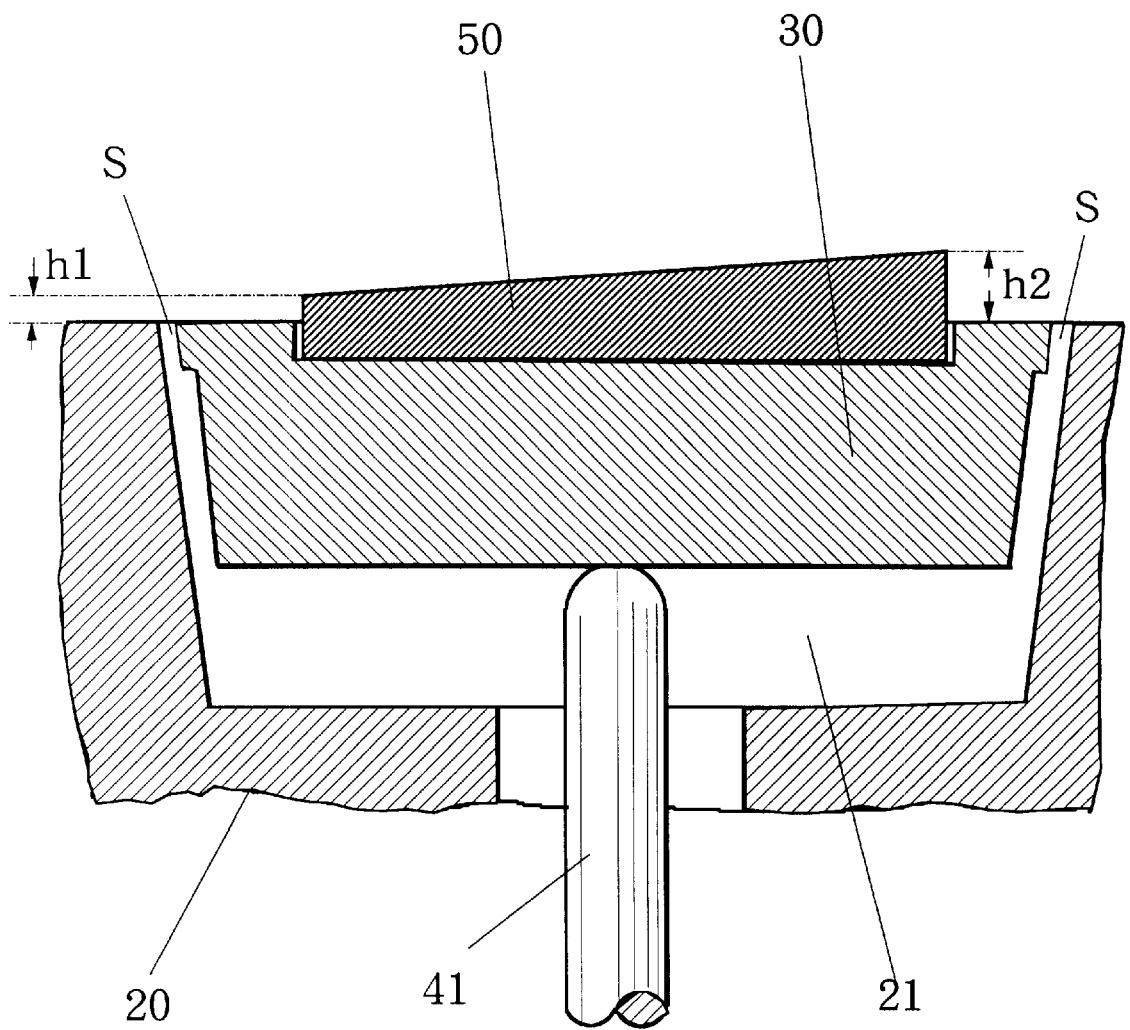
FIG. 2 shows an enlarged sectional view of the mold by this invention.

In FIG. 1, A section shows the condition where lower mold 20 is opened below upper mold 10, and a gate 11, which serves as the resin outflow path, and a cavity 12, which becomes the resin molding part, are prepared at the upper mold 10 side. Meanwhile, a recessed part 21 is formed and a movable supporting member (floating plate) 30 is disposed at the upper end side of lower mold 20. The planar shape of movable supporting member 30 may be any shape, such as rectangular, polygonal, circular, etc., and the planar shape of recessed part 21 corresponds to the planar shape of movable supporting member 30. Also, the planar shape of the entirety of movable supporting member 30 is preferably similar to the planar shape of an insert 50.

The tip of the shaft 41 of hydraulic ejector 40 contacts the central part of the lower face of movable supporting member 30 (i.e. the center of gravity of supporting member 30; that is, the center of gravity at the bottom face of the movable supporting member when insert 50 is set). At this contacting part, a recessed part may be formed in correspondence to the shape of the tip of shaft 41. Also, the tip of shaft 41 and the central part (center of gravity) of the lower face of movable supporting member 30 may be arranged to be attracted to each other by magnetic force or static electricity or may be provided with a structure with which a positioning pin is interposed.

Obviously to serve as part of an injection molding mold, the mechanical structure of movable supporting member 30 is required to endure the injection pressure of molten resin or rubber.

In FIG. 1, B section shows the condition where insert 50 has been set on the upper face of movable supporting member 30. The setting of insert 50 may be performed by automatic or manual operation.

As shown in C section in FIG. 1, after the setting of insert 50 has been completed, lower mold 20 is moved towards upper mold 10 and clamping is performed.

As shown in D section in FIG. 1, after completion of clamping, hydraulic ejector 40 is driven and shaft 41 is raised. When the tip of shaft 41 is raised further upon contacting the bottom part of movable supporting member 30, movable supporting member 30 rises while being restricted by the side face of recessed part 21 of lower mold 20 and the upper face of insert 50 comes in contact with the lower face of upper mold 10. Here, in the case where the ends of insert 50 differ in thickness, the movable supporting member 30, which is in point contact with the tip of shaft 41, tilts in the direction of canceling the thickness difference of insert 50. That is, movable supporting member 30 tilts so that the side at which the thickness of insert 50 is small will become higher and the formation of a gap at the surface of contact of the lower face of upper mold 10 with insert 50 is thereby prevented.

To describe the above action in further detail, in the case where insert 50 has a thickness difference, when insert 50 moves towards upper mold 10, the side (h2), at which the thickness is large, contacts the upper mold first and as the pressing by shaft 41 is continued further, the position of contact of the top part of the above mentioned h2 serves as a fulcrum so that only the side (h1), at which the thickness is small, moves and rotates until h1 and h2 are in surface contact with the lower face of upper mold 10.

In the condition shown in D section in FIG. 1, injection of synthetic resin, etc. via gate 11 is performed and the interior of cavity 12 becomes filled with synthetic resin.

In FIG. 1, E section shows the condition where the mold has been opened after the elapse of a predetermined amount of time for cooling (solidification) of the filled synthetic resin, and the molded product 60 is taken out by automatic or manual operation. Though in the embodiment shown in E section in FIG. 1, the hydraulic ejector 40 is operated in conjunction with the opening of the mold and shaft 41 is lowered to drop movable supporting member 30 to the bottom part of recessed part 21, the operation may be performed in the order of mold opening→removal of molded product 60→dropping of movable supporting member 30.

In FIG. 1, F section shows the return to the initial condition, in other words, the condition shown in A section in FIG. 1. One cycle of injection molding is thus completed.

Of the above cycle, a description shall now be given to aid the understanding of the functions and actions of the condition shown in D section in FIG. 1, that is, the process of mold clamping→driving of hydraulic ejector 40→raising of shaft 41 by point contact→raising and tilting of movable supporting member 30.

Figure 3:
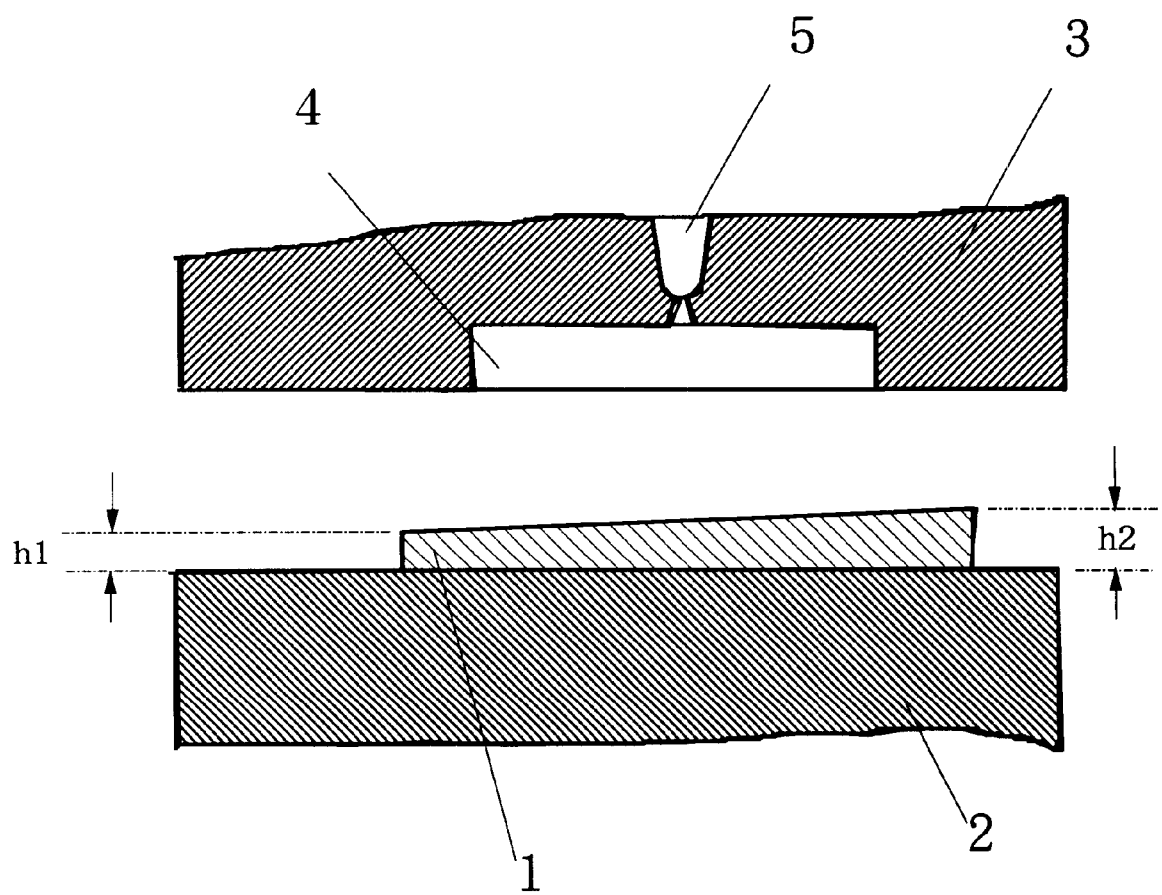
FIGS. 3 and 4 show an explanatory diagram of a prior art.
Figure 4:
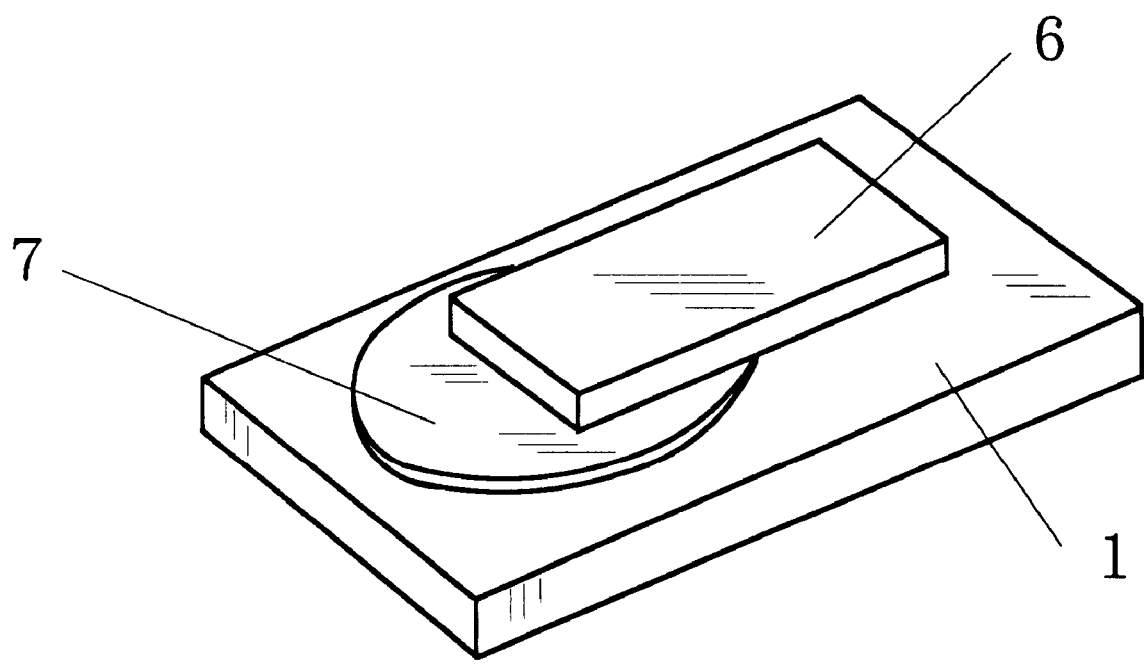

As shown in A section in FIG. 1, the side wall of recessed part 21, formed in lower mold 20, is formed in an inclined manner so that recessed part 21 becomes smaller in diameter in the downward direction. Thus when movable supporting member 30 is positioned at the lower side of recessed part 21, the side wall of recessed part 21 and the side face of movable supporting member 30 are in close contact, and when as shown in FIG. 3, movable supporting member 30 is pushed and positioned at the upper side of recessed part 21, a gap of a few $\mu$m to a few hundred microns, preferably a gap of few dozen $\mu$m to a few hundred $\mu$m, and more preferably a gap S of approximately 50 $\mu$m to 100 $\mu$m forms between the side wall of recessed part 21 and the side face of movable supporting member 30. In the case where the set insert 50 has a thickness difference h3 equal to h2−h1, the thickness difference h3 is absorbed by the above mentioned gap S upon tilting of movable supporting member 30 about the point of support by shaft 41, and since the upper face of insert 50 will thus come in close contact with the bottom face of upper mold 10, differences with respect to an insert 50 machined at high precision will not pose a problem.

The above-described action is realized by the existence of the gap S and the supporting of the lower face of movable supporting member 30 by point contact with the tip of shaft 41 of hydraulic ejector 40. Due to this reason, even when there is a difference h3 in the thickness of insert 50, the upper face of insert 50 can be tilted by an amount with which it will be in uniform surface contact with the lower face of upper mold 10.

Though movable supporting member 30 can be arranged to be able to tilt by supporting the lower face of movable supporting member 30 with a plurality of springs, etc. upon providing a gap S between the side wall of recessed part 21 and the side wall of movable supporting member 30, with such an arrangement, the pressing force of the springs will be fixed and cannot accommodate for the thickness difference h3 of a plurality of types of insert 50. Also, though an arrangement wherein the pressing force of the springs is made adjustable is also possible, such an arrangement, even if employed, will not be practical at all since the spring pressing force must be adjusted each time upon detecting the thickness difference h3 of an insert 50 for each insert to be set. Though an arrangement wherein the adjustment of the spring pressing force is performed by an automatic mechanism can also be considered, the spring pressing force cannot be adjusted automatically unless the thickness difference h3 of an insert 50 is detected each time an insert is set inside the mold.

A comparison of such hypothetical arrangements clearly show that the arrangement of the present invention is superior in that when the insert 50 that is set has a thickness difference h3, the thickness difference h3 can be absorbed simply by the tilting of movable supporting member 30 and thus without the provision of any special detection means.

Though a single-cavity type mold was described above as an example of an insert molding mold by this invention, this invention may obviously be applied to a multiple-cavity type mold for performing the injection molding of two or more molded products. Needless to say, in this case, each movable supporting member 30 is not affected by the movements of the other movable supporting members 30.

Obviously with the above-described embodiment, the upper mold may be arranged as a movable mold and the lower mold as a fixed mold. Such an embodiment is the same as the above-described embodiment besides the point that the mold clamping illustrated in C section in FIG. 1 is performed by moving upper mold 10 in the direction of approaching lower mold 20 and the point that the mold opening illustrated in E section in FIG. 1 is performed by moving upper mold 10 in the direction away from lower mold 20.

Besides the embodiments described above, an embodiment is also possible wherein, for example, the recessed part 21 to be formed in lower mold 20 is arranged to have a substantially vertical side face, the side face of movable supporting member 30 is also arranged to be substantially vertical, and a gap S is provided between the side faces of both components. With such an arrangement, the side face of movable supporting member 30 can be arranged as a smooth surface of uniform diameter or, for example, just a part (preferably just the upper end part) can be arranged as a protruded part as with the side face of the movable supporting member 30 shown in A section in FIG. 1.

An insert molding mold of this invention provides the following effects.

Since in the mold clamping process, movable supporting member 30 is pushed up by point contact with the tip of shaft 41 of hydraulic ejector 40 to cause insert 50 to contact the bottom face of upper mold 10, even when the precision of insert 50 is not secured, correction can be performed to accommodate for deviations in the setting of the insert and deformation of the insert.

Burrs will not tend to form on the molded product.

An insert molding mold of this invention can be applied to cases where insert 50 is made of glass, carbon, or other type of material that is easily breakable.

Whereas with injection molding using a prior-art insert molding mold, mold clamping was performed at a significantly higher pressure than the injection pressure in order to prevent the occurrence of burrs, with an insert molding mold by this invention, better molding can be performed at a floating pressure that is the same as or just slightly greater than the injection pressure.

What is claimed is:

1. An insert molding method, wherein an upper mold and a lower mold are disposed so as to oppose each other and the cavity at the upper mold side is filled with molten resin or rubber material that is injected through a gate to perform injection molding of the resin or rubber around an insert set at the lower mold side, said insert molding method being characterized in that a movable supporting member, which sets said insert, is fitted in a recessed part formed on the upper face of said lower mold, the position of the center of gravity at the lower face of the movable supporting member is supported and pressed towards the upper mold side by the tip of a shaft of a pressing mechanism, and a gap is made to exist between the side face part of said recessed part and the side face part of the movable supporting member to cause the movable supporting member to tilt about the point at which the movable supporting member is pressed and supported by said shaft inside said recessed part so that the upper face of the insert will be in uniform surface contact with the lower face of the upper mold.

2. An insert molding mold, which is comprised of (a) an upper mold, (b) a lower mold, which is disposed so as to oppose the upper mold, (c) a recessed part, formed on the upper face of said lower mold, (d) a movable supporting member, which is fitted into the recessed part, (e) an insert setting part, which is provided on the upper face of the movable supporting member, (f) a cavity, provided on the mold surface at the lower face of said upper mold that opposes said insert, and (g) a gate, provided at the upper mold for injection of molten resin or rubber material into the cavity, and is arranged for performing injection molding of resin or rubber material around the insert set on the upper face of said movable supporting member by filling of said cavity of the upper mold by injection of the molten resin or rubber material via the gate, said insert molding mold characterized in having (h) a pressing mechanism, which has a shaft that supports and presses the position of the center of gravity of the lower face of said supporting member towards the upper mold side and in that (i) a gap is formed between the side face part of said recessed part and the side face part of the movable supporting member and said movable supporting member is enabled to tilt about the point of pressing and support by said shaft inside said recessed part so that the upper face of the insert will be in surface contact with the lower face of the upper mold.

3. An insert molding method as set forth in claim 1, wherein the outer shape (planar shape) of the side face of said movable supporting member is formed to be similar to the outer shape (planar shape) of the side face of the insert.

4. An insert molding mold as set forth in claim 2, wherein the outer shape (planar shape) of the side face of said movable supporting member is formed to be similar to the outer shape (planar shape) of the side face of the insert.

5. An insert molding method as set forth in claim 1, wherein the gap between the side face part of said recessed part and the side face part of the movable supporting member is large at the side close to the upper mold and small at the side away from the upper mold.

6. An insert molding mold as set forth in claim 2, wherein the gap between the side face part of said recessed part and the side face part of the movable supporting member is large at the side close to the upper mold and small at the side away from the upper mold.

7. An insert molding method as set forth in claim 1, wherein the gap between the side face part of said recessed part and the side face part of the movable supporting member is arranged to be greatest at the position closest to the upper mold and to decrease gradually and become zero with the distance from the upper mold.

8. An insert molding mold as set forth in 2, wherein the gap between the side face part of said recessed part and the side face part of the movable supporting member is arranged to be greatest at the position closest to the upper mold and to decrease gradually and become zero with the distance from the upper mold.

* * * * *